United States Patent

[11] 3,615,887

| [72] | Inventor | Richard E. Ware<br>Trainer, Pa. |
|---|---|---|
| [21] | Appl. No. | 715,985 |
| [22] | Filed | Mar. 26, 1968 |
| [45] | Patented | Oct. 26, 1971 |
| [73] | Assignee | Sun Oil Company<br>Philadelphia, Pa. |

[54] METHOD OF PRODUCING ALUMINUM FOIL HAVING A GOLDEN COLOR
5 Claims, No Drawings

[52] U.S. Cl. .................................................. 148/6.3,
148/6.24, 148/6.27
[51] Int. Cl. .................................................. C23f 7/24
[50] Field of Search ............................................ 148/6.3,
6.27, 6.24, 6.35, 6

[56] References Cited
UNITED STATES PATENTS
| 1,672,180 | 6/1928 | Smith | 148/6.3 |
| 2,681,873 | 6/1954 | Deniston | 148/6.27 X |
| 2,859,147 | 11/1958 | Jeremias | 148/6.27 X |
| 3,332,809 | 7/1967 | Tanaka et al. | 148/6.35 |
| 3,418,219 | 12/1968 | Fahlbusch | 148/6.27 X |

FOREIGN PATENTS
| 543,793 | 7/1957 | Canada | 148/6.24 |
| 462,380 | 3/1937 | Great Britain | 148/6.3 |

OTHER REFERENCES
Morinaga et al., Chemical Abstracts Vol. 62: 158316 June 21, 1965.

Primary Examiner—Ralph S. Kendall
Attorneys—George L. Church, Donald R. Johnson and Wilmer E. McCorquodale, Jr.

ABSTRACT: A process for forming a golden-colored aluminum-surfaced article in which an aluminum-surfaced article is contacted with gaseous hydrogen sulfide and thereby creating said golden-colored surface.

METHOD OF PRODUCING ALUMINUM FOIL HAVING A GOLDEN COLOR

METHOD OF PRODUCING ALUMINUM FOIL HAVING A GOLDEN COLOR

This invention relates to an aluminum-surfaced article having a golden color, and more particularly, to a method of producing the golden-colored aluminum.

In recent years, aluminum and aluminum-coated objects have found great use in today's homes and industries for both decorative and architectural purposes. Concurrently, with said modern employment of the metal, attempts have been made to render the metal more attractive, or vary the basic color of the aluminum. Heretofore, the preferred method of applying a coating onto aluminum has been one of electrolysis. An improved method of coating aluminum by electrolysis has recently been disclosed in U.S. Pat. No. 3,227,639. The patent discloses an electrolyte, consisting essentially of at least one sulfophthalic acid selected from the group consisting of 4-sulfophthalic acid and 5-sulfoisophthalic acid, together with sulfate provided by at least one compound selected from the group consisting of sulfuric acid and water-soluble sulfates and bisulfates, and water, may be advantageously used in an electrolytic cell for anodizing aluminum, thereby producing decorative and protective coatings.

Although the electrolytic method has proved successful for decorating aluminum and other metals, it has, at the same time, proved uneconomical and time consuming. Hence, other methods were sought for supplying decorative finishes to aluminum.

According to this invention, an attractive gold color can be produced on an aluminum-surfaced article by reacting the metal with gaseous hydrogen sulfide. Hydrogen sulfide itself can be supplied directly to the reactor, or it can be supplied by the reaction or decomposition of any sulfur-containing compound or mixture capable of liberating the gas. Once the hydrogen sulfide is obtained, the aluminum is passed therethrough, and the gold color is produced in situ.

The concentration of the hydrogen sulfide in the vaporous state and the time required for the contact of the aluminum with the sulfur is dependent upon the aluminum area to be coated. For a greater area of aluminum to be coated, a larger concentration and a greater reaction time are required. Generally, a reaction time of 2½ to 6 hours is sufficient. Any structural form of aluminum-surfaced article is applicable to the present invention. Thus, the aluminum can be present as a foil, structural sheet, a coating on an object, preformed containers, etc.

As stated supra, either sulfur compounds or mixtures which liberate hydrogen sulfide upon heating can be employed in this process. Nonlimiting examples of sulfur-containing compounds are mercaptans, sulfur-bearing asphalts produced either by petroleum refining or naturally, and the like. The hydrogen sulfide can also be provided by reacting a compound such as butane, or any other alkane having more than one carbon atom, in the presence of sulfur. Similarly, any reaction capable of liberating hydrogen sulfide can be used. It should be noted that there are no actual temperature requirements for the instant process. All that is required is a temperature which will liberate the hydrogen sulfide from a compound when the gaseous compound is supplied in such a manner, and once the hydrogen sulfide is supplied, then a temperature to maintain such a state. An ambient temperature is generally sufficient to maintain the gaseous state.

As an operating example of this invention, a piece of aluminum foil approximately 10 to 12 inches 12 the sides is placed in a circulating oven in which asphalt containing approximately 4 percent by weight sulfur has been heated to about 450° F. The asphalt employed was obtained through a vacuum tower distillation of a West Texas crude oil. The asphalt had a molecular weight of 815 and a H/C ratio of 1.42. The viscosity of 210° F. was 1,169 cs. Upon fractionation, the asphalt yielded approximately 14 weight percent asphaltenes, 25 weight percent nonhydrocarbons, 31 weight percent aromatics, and 30 weight percent saturates. The foil is left in the oven for approximately 2½ hours, and when withdrawn, the foil has a bright golden color.

As a preferred method of commercial application, an aluminum article is moved by conveying means and fed into an oven in which vaporous hydrogen sulfide is present. The velocity of the aluminum through the gas is such that there is sufficient contact time prior to the aluminum's exit. If aluminum foil is the object of the process, the foil can be transferred from a feed roll to a takeup roll during the process.

As a second embodiment of the invention, any clear lacquer, varnish, or acrylic resin, such as Acryloid resins, trademark acrylic resin solutions of Rohm & Haas Company which are employed for transparent, weather-resistant coatings, can be applied to the golden-colored aluminum surface. These secondary coatings will supply protective, glossy finishes to the aluminum. The protective coating can be applied by various methods well known in the art, such as spraying or passage through a bath.

I claim:

1. A process for forming a golden-colored aluminum-based article which comprises contacting an aluminum-based article with anhydrous hydrogen sulfide in the vapor phase, and thereby creating a golden-colored surface.

2. A process as described in claim 1 wherein the vaporous hydrogen sulfide is supplied by the decomposition of a sulfur-containing compound which liberates hydrogen sulfide upon heating.

3. A process as described in claim 2 wherein the sulfur-containing compound is asphalt.

4. A process as described in claim 1 wherein, subsequent to the contacting of the aluminum-based article with the vaporous hydrogen sulfide, the article is protected with a clear coating selected from the group consisting of a lacquer, varnish, and acrylic resin.

5. A process as described in claim 4 wherein the protective coating is an acrylic resin.

* * * * *